United States Patent
Yu et al.

(10) Patent No.: US 6,669,868 B2
(45) Date of Patent: Dec. 30, 2003

(54) PHOSPHORS HAVING IMPROVED LUMINANCE AND LONGER LIFESPAN

(75) Inventors: Il Yu, Suwon (KR); Sang-hyuk Lee, Anyang (KR); Young chul You, Suwon (KR); Kyu-chan Park, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 40 days.

(21) Appl. No.: 10/026,609

(22) Filed: Dec. 27, 2001

(65) Prior Publication Data

US 2002/0121627 A1 Sep. 5, 2002

(30) Foreign Application Priority Data

Dec. 29, 2000 (KR) ........................................ 2000-86259

(51) Int. Cl.[7] ............................................. C09K 11/67
(52) U.S. Cl. ................. 252/301.4 F; 313/486; 313/483
(58) Field of Search .................. 252/301.4 F, 301.4 H; 313/483, 486

(56) References Cited

U.S. PATENT DOCUMENTS 5,619,098 A * 4/1997 Toki et al. ................. 313/496
6,139,774 A * 10/2000 Yamada et al. ........ 252/301.4 F

OTHER PUBLICATIONS

Patent Abstracts of Japan, Publication No.: 08-085788, dated Feb. 4, 1996.

* cited by examiner

Primary Examiner—C. Melissa Koslow
(74) Attorney, Agent, or Firm—Staas & Halsey LLP

(57) ABSTRACT

A phosphor having increased luminance and lifespan which includes a halide flux of the Group 1 element of the periodic table has a perovskite structure and satisfies the following formula:

$$MTiO_3: (A,B)$$

where M is an alkaline earth metal, A is a rare earth element, and B is a Group 13 element of the periodic table. The halide flux-containing phosphor shows good luminance and lifespan characteristics compared to conventional phosphors without using sulfur and environmentally harmful cadmium in a host matrix. Therefore, the phosphor is advantageously utilized for various display applications including vacuum fluorescent displays (VFDs) and field emission displays (FEDs).

20 Claims, 2 Drawing Sheets

- Ti
- O
- Alkali earth metal

PHOSPHORS HAVING IMPROVED LUMINANCE AND LONGER LIFESPAN

CROSS-REFERENCE TO RELATED APPLICATIONS

This application claims the benefit of Korean Patent Application No. 00-86259, filed Dec. 29, 2000, in the Korean Patent Office, the disclosure of which is incorporated herein by reference.

BACKGROUND OF THE INVENTION

1. Field of the Invention

The present invention relates to phosphors for use in a display device such as a vacuum fluorescent display (VFD), or field emission display (FED).

2. Description of the Related Art

Like cathode ray tubes (CRTs), VFDs are self-radiating displays using phosphors, and are widely used in applications such as digital displays of household electric appliances and gauge panels of automobiles. While VFDs have mainly been used for low-capacity, small-sized products that simply display numbers, characters, and signs, they are currently in use for high-density graphic image displays. In the near future, a full color VFD having a large display capacity will be commercially viable.

FEDs have received considerable attention as a next generation display device having advantages of flat panel displays, such as liquid crystal displays (LCDs) and CRTs. Thus, research on FEDs continues to be actively conducted. FEDs, which operate on the principle of field emission of electrons from microscopic tips, are known to be capable of overcoming the drawbacks of CRTs, such as excessive bulk and weight, and the drawbacks of LCDs, such as high manufacturing cost and limited size and viewing angle.

Furthermore, since FEDs have various advantages, such as a thin film form, low power consumption, low manufacturing cost, excellent temperature characteristics, and high-speed operation, they can be used in a wide variety of applications ranging from home televisions to industrial equipment and computers. In particular, FEDs are likely to be widely used in commercial applications such as notebook PCs, monitors, and televisions, like thin film transistor (TFT) LCDs.

A phosphor able to be excited by a low-velocity electron beam is required for use in VFDs or FEDs in order to emit light at an anode operating voltage of no greater than 1 kV. Conventional phosphors able to be excited by low-velocity electron beams are divided into two types. The first type is a phosphor based upon a low-resistance host matrix and the second is a phosphor based on a high-resistance host matrix and having a phosphor layer formed by adding a conductive material to reduce the resistance of the host matrix.

The host matrix of the high-resistance phosphors mostly contains sulfur (S) and thus the sulfur-containing phosphor is referred to as a "sulfide phosphor". It is known that the sulfide phosphor is readily decomposed when bombarded by electrons and the decomposed sulfide phosphor is scattered within a VFD. The sulfide based material impinges on a cathode in the VFD, thereby contaminating the cathode and thus degrading the emission power of the VFD. Another problem of the sulfide phosphor is that sulfide impinges on other oxide phosphors to contaminate an anode. Additionally, a ZnCdS-based host matrix contains a pollutant such as cadmium (Cd) that is harmful to the environment.

To overcome the drawbacks of conventional phosphors, a phosphor prepared by adding a rare earth element and a Group 13 element to a host matrix composed of an alkaline earth metal oxide and a titanium (Ti) oxide is disclosed in Japanese Patent Publication Gazette No. Heisei 8-85788 and U.S. Pat. No. 5,619,098, the disclosures of which are incorporated by reference. The phosphor host lattice does not contain sulfur and cadmium and can be excited by low-velocity electron beams to emit light. However, this phosphor has not been yet put into practice due to its short lifespan.

SUMMARY OF THE INVENTION

To solve the above problems, it is an objective of the present invention to provide a phosphor whose host matrix does not contain sulfur and which has a longer lifespan and an improved luminance in spite of the fact that it does not contain cadmium.

Additional objects and advantages of the invention will be set forth in part in the description which follows and, in part, will be obvious from the description, or may be learned by practice of the invention.

Accordingly, to achieve the above and/or other aspects of the present invention, there is provided a phosphor with a perovskite structure according to an embodiment of the present invention which includes a halide flux of the Group 1 element of the periodic table and satisfies the following formula:

$$MTiO_3: (A,B)$$

where M is an alkaline earth metal, A is a rare earth element, and B is a Group 13 element of the periodic table.

According to an aspect of the invention, the alkaline earth metal is Mg, Sr, Ca, or Ba, and the rare earth element is Ce, Pr, Eu, Tb, or Tm, where an amount of the rare earth element added is in the range of 0.05–5 mol % based on 1 mol of Ti.

According to another aspect of the invention, the Group 13 element is Al, Ga, In, or Tl, and an amount of the Group 13 element added is in the range of 0.05–80 mol % based on 1 mol of Ti.

According to a further aspect of the invention, a halide flux of a Group 1 element is at least one selected from the group consisting of LiI, NaI, KI, LiCl, NaCl, KCl, LiBr, NaBr, and KBr, and an amount of the halide flux of a Group 1 element is in the range of 0.01–10 mol % based on 1 mol of Ti.

According to another embodiment of the present invention, there is provided a fluorescent display device such as one of a field emission display and a vacuum fluorescent display comprising a phosphor of the present invention.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

The present invention provides a phosphor with an improved luminance and a longer lifespan by adding a halide flux of the Group 1 element of the periodic table. The halide flux improves energy transition efficiency in a host lattice of the phosphor which contains a rare earth element and a Group 13 element based on a host matrix composed of an alkaline earth metal oxide and a titanium oxide.

Figure 1:
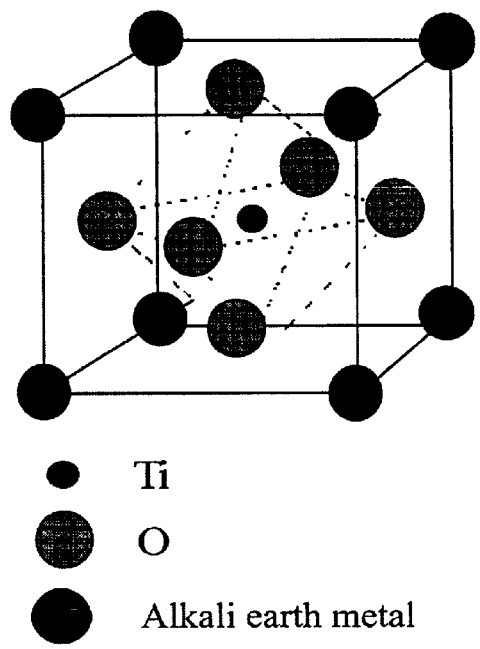
FIG. 1 is a diagram of a cubic perovskite structure of a phosphor according to the present invention.

FIG. 1 shows a cubic perovskite structure of a phosphor according to the present invention. In particular, titanium (Ti) is located at the center of the cubic perovskite structure, an alkaline earth metal is located on the vertices, and oxygen is located at the center of each face of the structure. Although not illustrated in FIG. 1, a rare earth element serving as an activator is located at the vertices by partially replacing an alkaline earth metal.

When the phosphor having the structure described above is excited by an external light, the light energy is absorbed by Ti and in turn transferred to the alkaline earth metal located at the vertices of the cubic perovskite structure to emit light. The activator substitute at the vertices considerably affects the light emission.

The luminescent efficiency of the activator to which energy is transferred from the center metal varies depending on the oxidation number of the activator. For example, a rare earth metal praseodymium (Pr) has better luminescent efficiency in the form of $Pr^{3+}$ than $Pr^{4+}$. Likewise, the energy transfer efficiency from the center metal is influenced by the oxidation number of the metal. For example, Ti used in the phosphor according to the present invention has better energy transfer efficiency in the form of $Ti^{3+}$ than $Ti^{4+}$.

The phosphor according to the present invention is prepared using a halide flux of the Group 1 element of the periodic table to reduce the center metal and the activator such that they have appropriate oxidation numbers for efficient energy transfer. When the halide flux is added to the host matrix of the phosphor, halogen atoms substitute oxygen atoms of the host matrix and generate free electrons to maintain the charge balance. The free electrons partially reduce the center metal and the activator such that they have oxidation numbers suitable for efficient energy transfer. As a result, the phosphor's energy transfer efficiency, luminance, and lifespan are improved.

Figure 2:
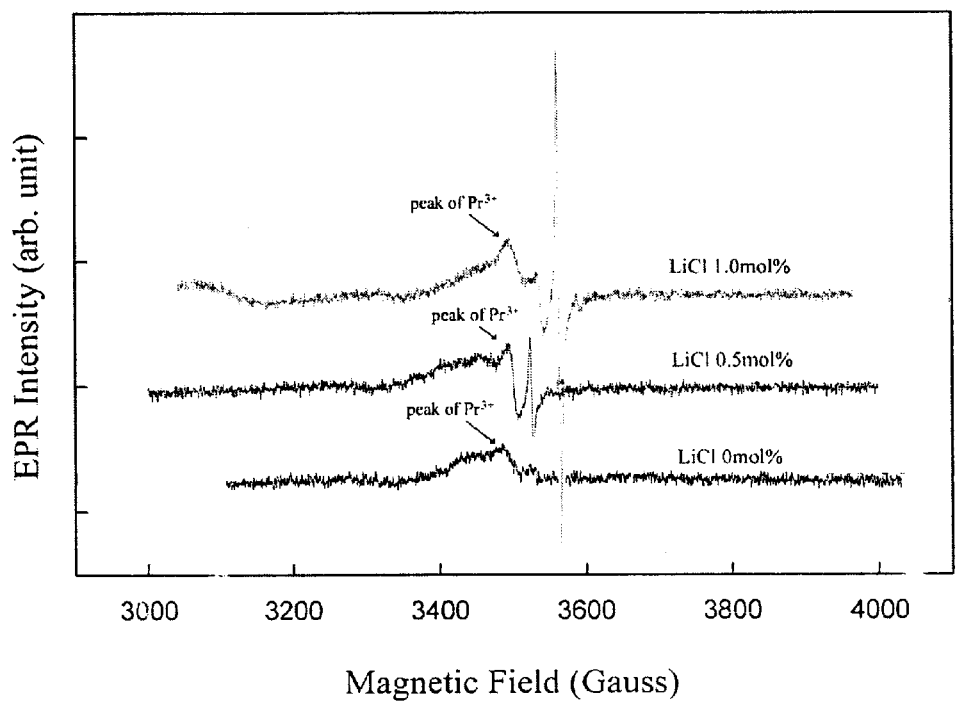
FIG. 2 is a graph showing the electron paramagnetic resonance (EPR) spectra versus the magnetic field for phosphors prepared by addition of a halide flux according to the present invention.
Figure 3:
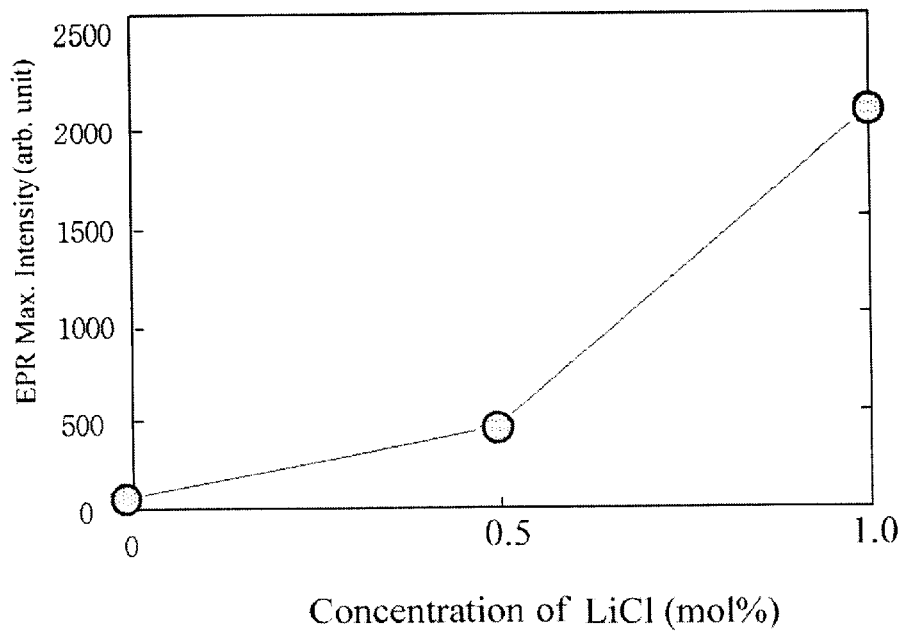
FIG. 3 is a graph showing the variations in maximum EPR intensity versus the concentration of the halide flux in the phosphors of FIG. 2.

FIG. 2 shows changes in the electron paramagnetic resonance (EPR) spectra for a phosphor containing Pr as an activator and obtained by substituting oxygen atoms of a phosphor host matrix ($SrTiO_3$) with halogen atoms (LiCl). In FIG. 2, middle peaks of the spectra denote the amount of $Pr^{3+}$. It is apparent that the conversion of $Pr^{4+}$ to $Pr^{3+}$ is facilitated with the increased addition of the halogen element. The maximum EPR intensity for the phosphors with variations in the concentration of LiCl is shown in FIG. 3.

According to an embodiment of the invention, the amount of the Group 1 halide flux in the host matrix is in the range of 0.01–10 mol % based on 1 mol of Ti. If the amount of the Group 1 halide flux is less than 0.01 mol % or greater than 10 mol % based on 1 mol of Ti, the luminance and lifespan of the phosphor degrade.

The phosphor according to the present invention is prepared by a typical phosphor preparation method. For example, a Group 1 halide element such as LiI, NaI, KI, LiCl, NaCl, KCl, LiBr, NaBr, or KBr, which is added as a flux in the present invention, is mixed with $SrCO_3$, $TiO_2$, $Al(OH)_3$, and $PrCl_3$ and ground in an alumina mortar. The resultant mixture is sintered at a temperature of about 1,000–1,500° C. for about 1–12 hours to obtain a phosphor according to the present invention.

The phosphor according to the present invention has excellent luminance and lifespan while not containing S in its host matrix, and is also environmentally friendly since it does not contain cadmium that is harmful to the environment. The phosphor according to the present invention can be used for vacuum fluorescent displays (VFDs) or field emission displays (FEDs).

Accordingly, a fluorescent display device according to another embodiment of the present invention comprising the phosphor of the present invention has good luminance and lifespan characteristics as compared to a conventional fluorescent display device.

Hereinafter, embodiments of the present invention will be presented in more detail. However, it is understood that the present invention is not limited to the examples presented below.

EXAMPLE 1

1 mol of $SrCO_3$, 1 mol of $TiO_2$, 23 mol % $Al(OH)_3$, 0.5 mol % $PrCl_3$, and 0.3 mol % LiI were mixed and ground in an alumina mortar and sintered at a temperature of 1,200° C. for 3 hours to obtain a phosphor.

EXAMPLES 2–7

Phosphors were prepared in the same manner as in Example 1 according to the compositions shown in Table 1.

TABLE 1

| | | Composition for Examples 2–7 | | | | | |
|---|---|---|---|---|---|---|---|
| | Example | Example 2 | Example 3 | Example 4 | Example 5 | Example 6 | Example 7 |
| Alkaline earth metal | Compound Content (mol) | $SrCO_3$ 1 | $SrCO_3$ 1 | $SrCO_3$ 1 | $SrCO_3$ 1 | $SrCO_3$ 1 | $SrCO_3$ 1 |
| Ti oxide | Compound Content(mol) | $TiO_2$ 1 | $TiO_2$ 1 | $TiO_2$ 1 | $TiO_2$ 1 | $TiO_2$ 1 | $TiO_2$ 1 |
| Group 13 element | Compound Content (mol %) | $Al(OH)_3$ 23 | $Al(OH)_3$ 23 | $Al(OH)_3$ 23 | $Al(OH)_3$ 23 | $Al(OH)_3$ 23 | $Al(OH)_3$ 23 |

TABLE 1-continued

Composition for Examples 2–7

| Example | | Example 2 | Example 3 | Example 4 | Example 5 | Example 6 | Example 7 |
|---|---|---|---|---|---|---|---|
| Rare earth element | Compound | $PrCl_3$ | $PrCl_3$ | $PrCl_3$ | $PrCl_3$ | $PrCl_3$ | $PrCl_3$ |
| | Content (mol %) | 0.5 | 0.5 | 0.5 | 0.5 | 0.5 | 0.5 |
| Additive | Compound | NaI | LiCl | KCl | KBr | LiCl | LiCl |
| | Content (mol %) | 0.3 | 0.3 | 0.3 | 0.3 | 0.5 | 1.0 |
| Sintering temperature (° C.) | | 1,200 | 1,200 | 1,200 | 1,200 | 1,200 | 1,200 |
| Sintering time (hour) | | 3 | 3 | 3 | 3 | 3 | 3 |

Comparative Example 1 mol of $SrCO_3$, 1 mol of $TiO_2$, 23 mol % $Al(OH)_3$, and 0.5 mol % $PrCl_3$ were mixed and ground in an alumina mortar and sintered at 1,200° C. for 3 hours to obtain a phosphor.

Lifespan Test

A lifespan test was performed for the phosphors prepared in Examples 1 through 7 and in Comparative Example to determine a remaining luminance ratio after 1,000 hours of operation. The results are shown in Table 2.

TABLE 2

Remaining luminance ratio after 1,000 hours

| Example | Remaining luminance ratio after 1,000 hours |
|---|---|
| Example 1 | 75% |
| Example 2 | 70% |
| Example 3 | 75% |
| Example 4 | 70% |
| Example 5 | 75% |
| Example 6 | 75% |
| Example 7 | 75% |
| Comparative example | 40% |

The 1000-hour remaining luminance ratio is defined by a percentage of remaining luminance measured after 1,000 hours of operation with respect to an initial luminance of a phosphor. The phosphor containing a halide flux of the Group 1 element of the periodic table according to the present invention has a remaining luminance ratio higher than conventional phosphors containing no halide flux.

Luminance Test

Figure 4:
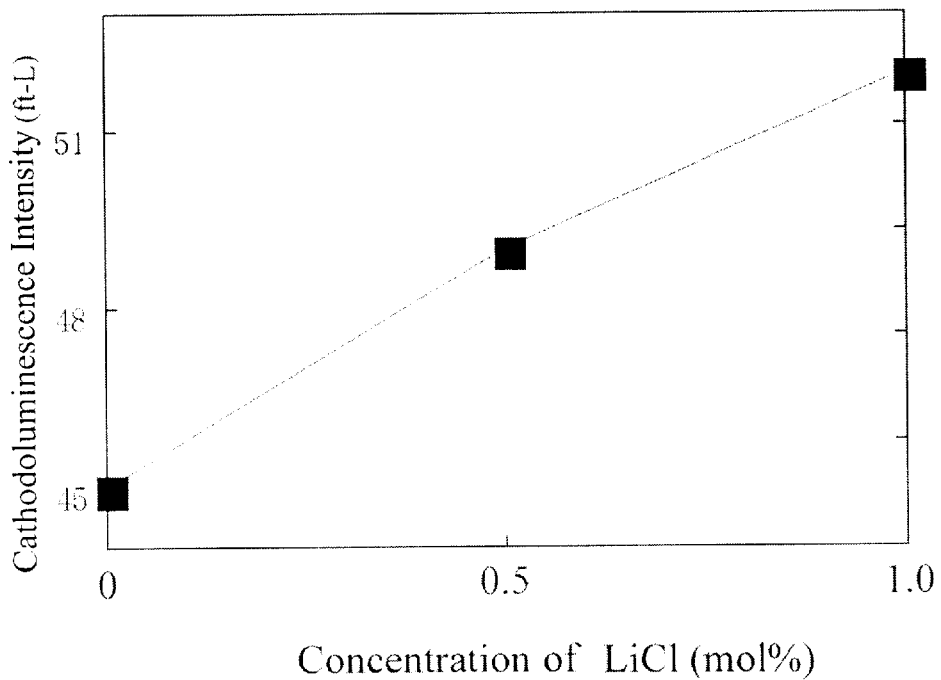
FIG. 4 is a graph showing the variations in cathodoluminescence versus the concentration of the halide flux in the phosphors prepared according to the present invention.

Luminance was measured for the phosphors prepared in Examples 6 and 7 and in Comparative Example. The results are shown in FIG. 4. As shown in FIG. 4, the luminance of the phosphors prepared in Examples 6 and 7 with the addition of the halide flux was improved by a maximum of about 15%.

As described above, the present invention provides phosphors having increased luminance and lifespan compared to conventional phosphors without using cadmium that is harmful to the environment. Therefore, the phosphors according to the present invention are advantageously utilized for various display applications including vacuum fluorescent displays (VFDs) and field emission displays (FEDs).

Although a few preferred embodiments of the present invention have been shown and described, it will be appreciated by those skilled in the art that changes may be made in these embodiments without departing from the principles and the spirit of the invention, the scope of which is defined in the claims and their equivalents.

What is claimed is:

1. A phosphor with a perovskite structure comprising a halide flux of a Group 1 element of the periodic table and which satisfies the following relation:

$$MTiO_3: (A,B)$$

where M is an alkaline earth metal, A is a rare earth element, and B is a Group 13 element of the periodic table and wherein the rare earth element is an element selected from the group consisting of cerium, praseodymium, europium, terbium, and thulium.

2. The phosphor of claim 1, wherein the alkaline earth metal is an element selected from the group consisting of magnesium, strontium, calcium, and barium.

3. The phosphor of claim 1, wherein the rare earth element added to the phosphor is in a range of 0.05–5 mol % based on 1 mol of Ti.

4. The phosphor of claim 1, wherein the Group 13 element is one selected from the group consisting of aluminum, gallium, indium, and thallium.

5. The phosphor of claim 1, wherein the Group 13 element added to the phosphor is in a range of 0.05–80 mol % based on 1 mol of Ti.

6. The phosphor of claim 1, wherein said halide flux of the Group 1 element contained in the phosphor is in a range of 0.01–10 mol % based on 1 mol of Ti.

7. The phosphor of claim 1, wherein
   the rare earth element added to the phosphor is in a range of 0.05–5 mol % based on 1 mol of Ti, and
   the Group 13 element added to the phosphor is in a range of 0.05–80 mol % based on 1 mol of Ti.

8. The phosphor of claim 7, wherein said halide flux of the Group 1 element contained in the phosphor is in the range of 0.01–10 mol % based on 1 mol of Ti.

9. The phosphor of claim 8, wherein the alkaline earth metal is an element selected from the group consisting of magnesium, strontium, calcium, and barium.

10. The phosphor of claim 9, wherein the rare earth element is an element selected from the group consisting of cerium, praseodymium, europium, terbium, and thulium.

11. The phosphor of claim 10, wherein the Group 13 element is one selected from the group consisting of aluminum, gallium, indium, and thallium.

12. A phosphor with a perovskite structure comprising a halide flux of a Group 1 element of the periodic table and which satisfies the following relation:

$$MTiO_3: (A,B)$$

where M is an alkaline earth metal, A is a rare earth element, and B is a Group 13 element of the periodic, wherein said halide flux of the Group 1 element is at least one element selected from the group consisting of LiI, NaI, KI, LiCl, NaCl, KCl, LiBr, NaBr, and KBr.

13. A phosphor with a perovskite structure comprising a halide flux of a Group 1 element of the periodic table and which satisfies the following relation:

$$MTiO_3: (A,B)$$

where M is an alkaline earth metal, A is a rare earth element, and B is a Group 13 element of the periodic table, wherein
the alkaline earth metal is an element selected from the group consisting of magnesium, strontium, calcium, and barium, and
the rare earth element is an element selected from the group consisting of cerium, praseodymium, europium, terbium, and thulium.

14. The phosphor of claim 13, wherein the Group 13 element is one selected from the group consisting of aluminum, gallium, indium, and thallium.

15. The phosphor of claim 14, wherein the halide flux of the Group 1 element is at least one element selected from the group consisting of LiI, NaI, KI, LiCl, NaCl, KCl, LiBr, NaBr, and KBr.

16. The phosphor of claim 15, wherein the rare earth element added to the phosphor is in a range of 0.05–5 mol % based on 1 mol of Ti.

17. The phosphor of claim 16, wherein the Group 13 element added to the phosphor is in a range of 0.05–80 mol % based on 1 mol of Ti.

18. The phosphor of claim 17, wherein the halide flux of the Group 1 element contained in the phosphor is in a range of 0.01–10 mol % based on 1 mol of Ti.

19. A fluorescent display device comprising the phosphor of claim 1.

20. The fluorescent display device of claim 19, wherein the fluorescent display device is one of a field emission display and a vacuum fluorescent display.

* * * * *